US012176963B2

(12) United States Patent
Deforge et al.

(10) Patent No.: US 12,176,963 B2
(45) Date of Patent: Dec. 24, 2024

(54) CALIBRATION AND TEST OF RADIOS SPANNING DIGITAL AND ANALOG DOMAINS

(71) Applicant: Dell Products L.P., Round Rock, TX (US)

(72) Inventors: John Bradley Deforge, Chelsea (CA); Danyi Rong, Ottawa (CA); Sewvanda Don, Ottawa (CA); Tommy Ivarsson, Ottawa (CA); Ankur Pimpale, Stittsville (CA); Mikhail Shenouda, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/510,533

(22) Filed: Nov. 15, 2023

(65) Prior Publication Data

US 2024/0089013 A1    Mar. 14, 2024

Related U.S. Application Data

(63) Continuation of application No. 17/660,343, filed on Apr. 22, 2022, now Pat. No. 11,848,712.

(51) Int. Cl.
*H04B 17/00*    (2015.01)
*H04B 17/11*    (2015.01)

(52) U.S. Cl.
CPC .................................. *H04B 17/11* (2015.01)

(58) Field of Classification Search
CPC .... H04B 17/101; H04B 17/103; H04B 17/11; H04B 17/19; H04B 17/202; H04B 17/22; H04B 17/221; H04B 17/297
See application file for complete search history.

(56) References Cited

U.S. PATENT DOCUMENTS

| | | | |
|---|---|---|---|
| 8,908,575 B2* | 12/2014 | Zargari | H04L 27/368 370/295 |
| 9,031,514 B2 | 5/2015 | Olesen et al. | |
| 9,736,790 B1 | 8/2017 | Haub et al. | |
| 10,320,494 B2 | 6/2019 | Chung et al. | |
| 11,581,961 B2* | 2/2023 | Raghavan | H04B 17/21 |
| 11,855,667 B2* | 12/2023 | Buer | H04B 17/15 |
| 2013/0272175 A1 | 10/2013 | Zargari et al. | |
| 2014/0146866 A1 | 5/2014 | Strachan et al. | |

(Continued)

OTHER PUBLICATIONS

International Search Report and Written Opinion for PCT Application No. PCT/US2022/053283 mailed Apr. 28, 2023, 14 pages.

(Continued)

*Primary Examiner* — Tuan Pham

(74) *Attorney, Agent, or Firm* — Amin, Turocy & Watson, LLP

(57) ABSTRACT

A system can comprise a radio unit that comprises a transmitter and a receiver. The system can further comprise a first hardware component that communicatively couples the transmitter and the receiver. The system can further comprise a second hardware component that is configured to transmit an analog signal from the transmitter to the receiver via the first hardware component. The system can further comprise a third hardware component that is configured to evaluate operation of the radio unit based on the analog signal received at the receiver.

20 Claims, 16 Drawing Sheets

(56) References Cited

U.S. PATENT DOCUMENTS

2015/0139046 A1    5/2015    Wang et al.
2022/0131562 A1    4/2022    Buer et al.

OTHER PUBLICATIONS

Office Action mailed May 18, 2023 for U.S. Appl. No. 17/660,343, 25 pages.
Office Action mailed Jun. 15, 2023 for U.S. Appl. No. 17/660,343, 14 pages.
Notice of Allowance mailed Oct. 4, 2023 for U.S. Appl. No. 17/660,343, 18 pages.
Notification Concerning Transmittal of International Preliminary Report on Patentability for PCT Application No. PCT/US2022/053283 mailed Oct. 31, 2024, 9 pages.

\* cited by examiner

600

FIRST HARDWARE COMPONENT THAT IS CONFIGURED TO TRANSMIT AN ANALOG SIGNAL FROM A TRANSMITTER OF A RADIO UNIT TO A RECEIVER OF THE RADIO UNIT VIA AN ANALOG LOOPBACK BETWEEN THE TRANSMITTER AND THE RECEIVER 602

SECOND HARDWARE COMPONENT IS CONFIGURED TO EVALUATE OPERATION OF THE RADIO UNIT BASED ON THE ANALOG SIGNAL RECEIVED AT THE RECEIVER 604

FIRST HARDWARE COMPONENT THAT IS CONFIGURED TO TRANSMIT AN ANALOG SIGNAL FROM A TRANSMITTER OF A RADIO UNIT TO A RECEIVER OF THE RADIO UNIT VIA AN ANALOG LOOPBACK BETWEEN THE TRANSMITTER AND THE RECEIVER 702

SECOND HARDWARE COMPONENT IS CONFIGURED TO EVALUATE OPERATION OF THE RADIO UNIT BASED ON THE ANALOG SIGNAL RECEIVED AT THE RECEIVER 704

THIRD HARDWARE COMPONENT THAT IS CONFIGURED TO INJECT A CUSTOM SIGNAL INTO THE RADIO UNIT, WHEREIN THE SECOND HARDWARE COMPONENT IS CONFIGURED TO CALIBRATE A DOWN LINK ANTENNA OF THE RADIO UNIT AND AN UP LINK ANTENNA OF THE RADIO UNIT DURING LIVE-AIR DATA 706

FIRST HARDWARE COMPONENT THAT IS CONFIGURED TO TRANSMIT AN ANALOG SIGNAL FROM A TRANSMITTER OF A RADIO UNIT TO A RECEIVER OF THE RADIO UNIT VIA AN ANALOG LOOPBACK BETWEEN THE TRANSMITTER AND THE RECEIVER 802

SECOND HARDWARE COMPONENT IS CONFIGURED TO EVALUATE OPERATION OF THE RADIO UNIT BASED ON THE ANALOG SIGNAL RECEIVED AT THE RECEIVER 804

THIRD HARDWARE COMPONENT THAT IS CONFIGURED TO INJECT A CUSTOM SIGNAL THAT IS SOURCED FROM A DOWN LINK OF THE RADIO UNIT DURING NON-LIVE-AIR DATA USING CUSTOM SIGNALING, WHEREIN THE SECOND HARDWARE COMPONENT IS CONFIGURED TO CALIBRATE AND TEST AN UP LINK OF THE RADIO UNIT BASED ON THE CUSTOM SIGNAL. 806

FIG. 8

CALIBRATION AND TEST OF RADIOS SPANNING DIGITAL AND ANALOG DOMAINS

RELATED APPLICATION

The subject patent application is a continuation of, and claims priority to, U.S. patent application Ser. No. 17/660,343, filed Apr. 22, 2022, and entitled "CALIBRATION AND TEST OF RADIOS SPANNING DIGITAL AND ANALOG DOMAINS," the entirety of which priority application is hereby incorporated by reference herein.

BACKGROUND

A radio can comprise a receiver and a transmitter that are used to receive and transmit, respectively, data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a radio unit that comprises a transmitter and a receiver. The system can further comprise a first hardware component that communicatively couples the transmitter and the receiver. The system can further comprise a second hardware component that is configured to transmit an analog signal from the transmitter to the receiver via the first hardware component. The system can further comprise a third hardware component that is configured to evaluate operation of the radio unit based on the analog signal received at the receiver.

An example method can comprise transmitting, by a system comprising a processor, an analog signal from a transmitter of a radio unit to a receiver of the radio unit via an analog loopback of the radio unit. The method can further comprise evaluating, by the system, operation of the radio unit based on the analog signal received at the receiver.

An example apparatus can comprise a first hardware component that is configured to transmit an analog signal from a transmitter of a radio unit to a receiver of the radio unit via an analog loopback between the transmitter and the receiver. The apparatus can further comprise a second hardware component is configured to evaluate operation of the radio unit based on the analog signal received at the receiver.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates another example system architecture that can facilitate calibration and test of radios spanning digital and analog domains, in accordance with an embodiment of this disclosure;

FIG. 7 illustrates another example system architecture that can facilitate calibration and test of radios spanning digital and analog domains, in accordance with an embodiment of this disclosure;

FIG. 8 illustrates another example system architecture that can facilitate calibration and test of radios spanning digital and analog domains, in accordance with an embodiment of this disclosure;

DETAILED DESCRIPTION

Overview

Figure 1A:
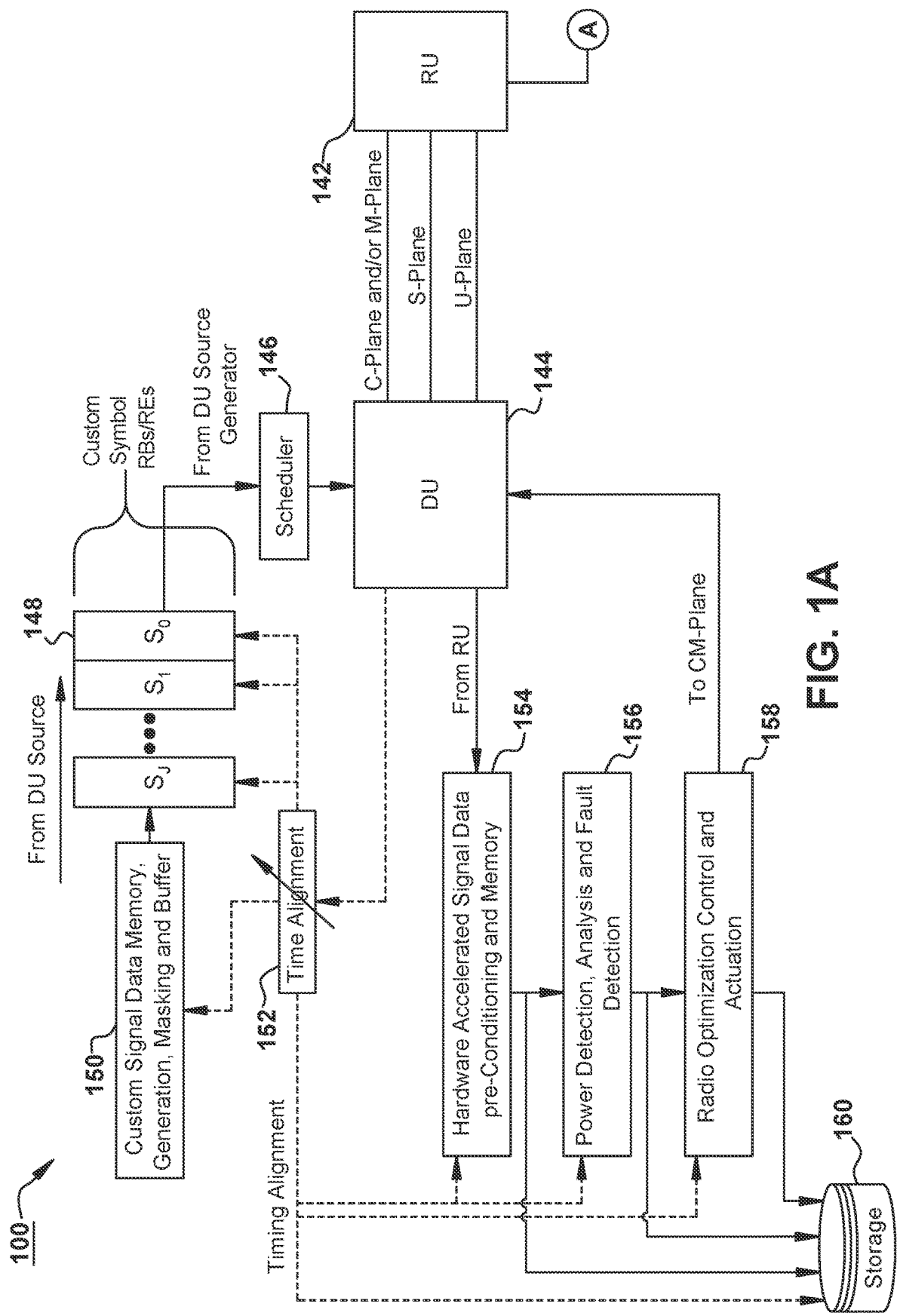
FIG. 1A and FIG. 1B illustrate an example system architecture that can facilitate calibration and test of radios spanning digital and analog domains, in accordance with an embodiment of this disclosure.

In modern wireless communications deployments, aspects and impacts of radio development engineering and system design tradeoffs can have far-reaching implications into customer capital expenditures, operating expenditures and overall completeness of a vendor's radio offerings. These engineering and systems design tradeoffs can result in what can be generally characterized as overall radio size, weight, thermal dissipation, reliability, complexity, and cost.

The present techniques can be implemented to self-stimulate, capture, analyze, and store key frequency domain data and time domain data. This can facilitate an ability to perform key system measurements in production, and that can facilitate a lower production cost of a radio system.

The present techniques can be implemented to apply factory calibration of a radio system asynchronously with a factory test can facilitate flexibility of a test platform. This can facilitate a lower production cost of a radio system.

The present techniques can be implemented to evaluate or re-evaluation production data of a radio's digital and analog signal paths, combined with an ability to analyze, store, and/or contrast key radio performance metrics in an autonomous fashion in production and throughout a lifecycle of the radio. This can facilitate a lower lifecycle cost of the radio.

The present techniques can be implemented to calibrate and self-test a radio using an analog loopback topology.

According to the present techniques, a radio unit transmitted can act as a signal generator for analog components, and a radio unit receiver can act as a signal analyzer, or spectrum analyzer, to capture signals that have passed through the analog components. The present techniques can be implemented to link the transmitter to the receiver, which can provide an analog loopback path through an analog section of the radio.

Implementing the present techniques can lower costs associated with radio testing. The present techniques can be implemented to provide a platform for radio production tests and calibrations to fully characterize the radio.

In some examples, a self-tested radio can be a higher quality than a non-self-tested radio, as the "test set" can be the radio itself. Storage of production test data can be available and stored on a radio according to the present techniques, along with calibration data.

In some examples, each radio can be re-testable in the field once leaving a factory where the radio is built. That is, in some examples, a full factory self-test can be repeatable at any time in the radio's deployed life.

A radio according to the present techniques can have an ability to convey its field self-tested data to a distributed unit, a central unit, or back to an entity that created the radio for further storage and analysis.

The present techniques can facilitate a digital twin, where a radio in the field can have a "digital twin"—a digital representation of an ongoing lifetime performance of the radio. A digital twin can be leveraged for predictive performance and lower cost of ownership long-term through predictive soft failure and maintenance, or determination of no faults found (NFFs) in a field setting.

The present techniques can be implemented to provide analog loopback coverage for all antenna branches of a radio system. A radio tested according to the present techniques can be referred to as being able to autonomously test or "self test."

The present techniques can be implemented to use digital and analog signal path features for calibration and test of a radio. In an example, the present techniques can facilitate radio test and calibration execution. Injection and looping of signal data can be performed via digital and analog paths that are internal to a radio. The signal data can be captured, stored, and analyzed, which can facilitate performing a self-test.

Test data can be used to analyze signals captured and derive and store key performance data in a radio-local database. Where test paths are internal to the radio, it can be that repeatability of resultant test values has a limited amount of variation.

In some examples, it can be that calibration is not required to be performed coincidentally with test execution, so calibration can be performed out of sync with a test. Calibration performed asynchronously with test execution can be updated and/or applied to test data so as to derive absolute performance of tested radio parameters.

In another example case, an antenna loopback according to the present techniques can facilitate calibration of down link and up link antennas during live-air data (sometimes referred to as mission mode data) using custom signaling.

In another example case, the present techniques can be implemented to facilitate an analog loopback topology that facilitates up link test and calibration using custom signals sourced from the down link during, for example, non-live-air data using custom signaling.

In another example case, calibration and test can be controlled, and stimulation can originate from only the radio unit, from only the distributed unit, or from a hybrid combination of radio unit and distributed unit interactions. In some examples, the control can be prescriptive and used to generate a series of commands to activate a radio unit's test and calibration modes. In another example, the control can originate from a deterministically generated series of commands to activate the radio unit's test and calibration modes.

Capture and termination of signals, analysis, and data can occur on the radio unit, from only the distributed unit, or from a hybrid combination of radio unit and distributed unit interactions.

Relevant data relating to a factory test, calibration, and subsequent tests can be stored on a radio in a local database. Historical performance data can be recalled, and compared and/or contrasted together with current data. Data that is compared and/or contrasted can be further analyzed to derive health, aging, soft fail, no fault found (NFF), and/or diagnostic data.

Data from a field of deployed radios can be returned to the radio manufacturer (or another entity) for further analysis, including management of a digital twin, machine learning/artificial intelligence (MI/AL), or other purposes. Field data can be further used to perform post-production fine tuning of radio performance parameters through radio production software updates, and made available as software platform updates for the radio.

Some prior approaches to loopbacks in radios can generally involve antenna loopbacks. These prior approaches can differ from the present techniques. According to the present techniques, a signal source can be derived from a radio unit, a distributed unit, or a hybrid of live-air and custom signal data. According to the present techniques, a loop (or alternative analog signal radio path) can be chosen for its characteristics of low noise floor and high linearity; it can be that such a signal is not impacted by power amplifier non-linearities, and can effectively be a clean analog-sourced signal. According to the present techniques, an isolation can be implemented between signal sources and other signals that can pollute a cleanliness of the signal source, so the signal can remain clean until it is injected into its intended source point.

According to the present techniques, circuitry to transport a signal via an analog loopback can be designed such that the signal can arrive at a source point such that it meets a signal-to-noise performance metric. The present techniques can be implemented provide full coverage of circuitry that is not covered by prior techniques (such as observation and FBRx receivers), and can be implemented to provide full coverage of all radio analog circuitry (and, by extension, digital circuitry).

Analog circuitry can have latency as a signal passes from block to block. For ease of comparison and hardware acceleration in a determination of radio performance, time alignment can be implemented to facilitate a precise alignment of a source signal and a signal that is captured. In some examples, the signal is not captured at an input, but can be a memory representation of the input signal.

Example Architectures

Figure 1B:
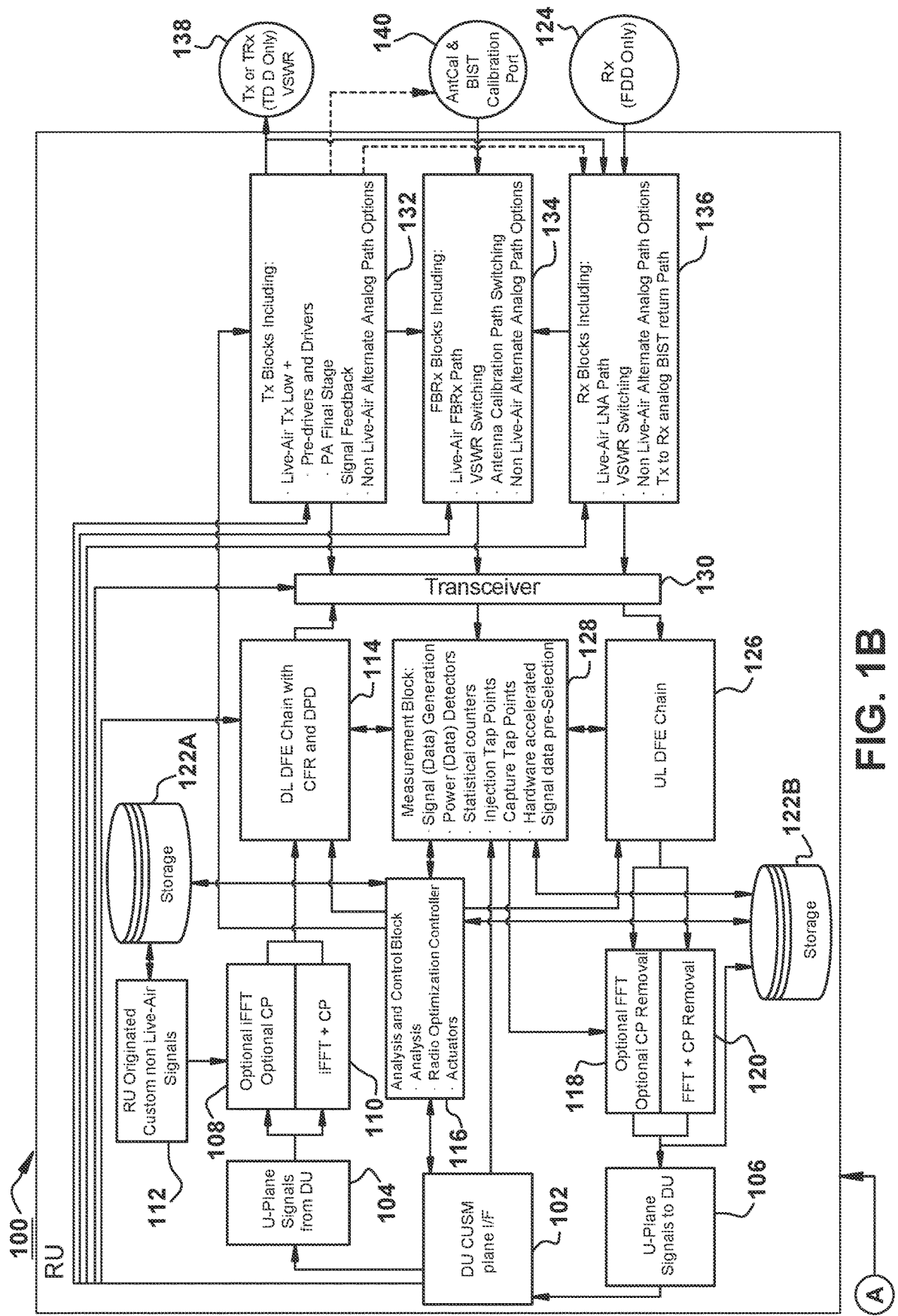

FIG. 1A and FIG. 1B illustrate an example system architecture 100 that can facilitate calibration and test of radios spanning digital and analog domains, in accordance with an embodiment of this disclosure.

As depicted, system architecture 100 comprises distributed unit (DU) control user synchronization management (CUSM) plane interface (I/F) 102, U-plane signals from DU 104, U-plane signals to DU 106, optional iFFT and CP 108, iFFT and CP 110, radio unit (RU) originated custom non-live-air traffic signals 112, DL DFE chain 114, analysis and control block 116, optional FFT and optional CP removal 118, FFT and CP removal 120, storage 122A and storage 122B, Rx port 124, UL DFE chain 126, measurement block 128, transceiver 130, transmission (Tx) blocks 132, feedback receiver (FBRx) blocks 134, receiver (Rx) blocks 136, Tx or transceiver (TRx) port 138, and antenna calibration (AntCal) and built-in self-test (BIST) calibration port 140.

Down link (DL) DFE chain 114 can include CFR and DPD. Measurement block 128 can comprise signal (data) generation, power (data) detectors, statistical counters, injection tap points, capture tap points, and/or hardware accelerated signal data pre-selection.

Tx blocks 132 can include Tx low, pre-drivers and drivers, power amplifier (PA) final stage), signal feedback, and non-live-air traffic alternate analog path options. FBRx blocks 134 can include a live-air traffic FBRx path, voltage standing wave ratio (VSWR) mode switching, and non-live-air traffic alternate analog path options. Rx blocks 136 can include a live-air traffic low noise amplifier (LNA) path, VSWR switching, and non-live-air traffic analog path options. Rx port 124 can include a separate port for the case of frequency-division duplexing (FDD) radio architectures.

These above components of system architecture 100 can be part of radio unit (RU) 142. System architecture 100 also comprises distributed unit (DU) 144, scheduler 146, custom symbol resource bands/resource elements (RBs/REs) 148, custom signal data memory, generation, masking, and buffer 150, time alignment 152, hardware accelerated signal data pre-conditioning and memory 154, analysis and fault detection 156, radio optimization control and actuation 158, and storage 160.

In system architecture 100, an analog loopback can be implemented between a transmitter and a receiver of transceiver 130. This analog loopback can be used to perform various radio system functions, such as calibration or self-test. For instance, a loopback can be implemented between transmission (Tx) blocks 132, and receiver (Rx) blocks 136. In other examples, a loopback can be implemented between transmission (Tx) blocks 132, antenna calibration (AntCal) and built-in self-test (BIST) calibration port 140, and feedback receiver (FBRx) blocks 134.

Figure 2:
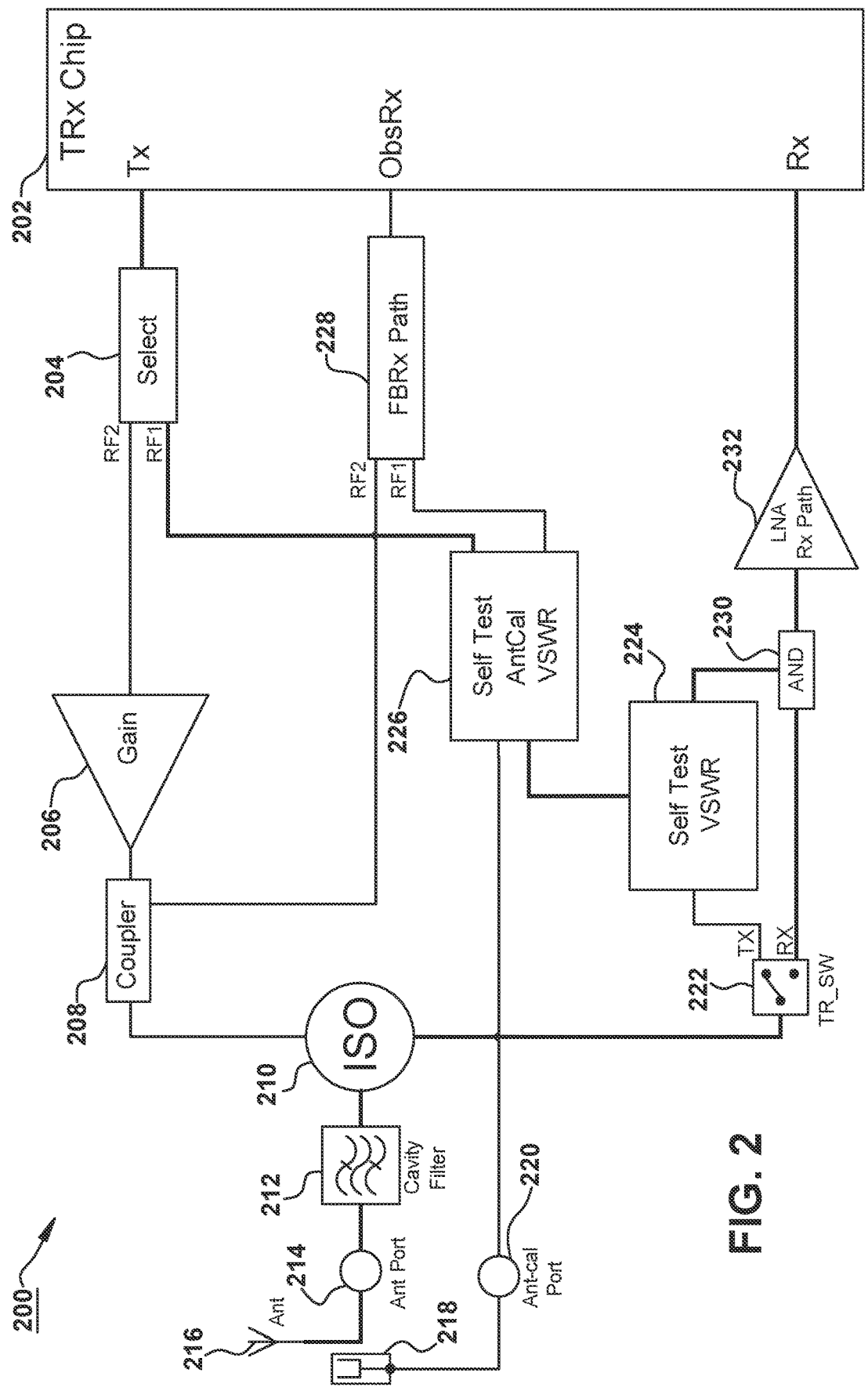
FIG. 2 illustrates another example system architecture that can facilitate calibration and test of radios spanning digital and analog domains, in accordance with an embodiment of this disclosure.

FIG. 2 illustrates another example system architecture 200 that can facilitate calibration and test of radios spanning digital and analog domains, in accordance with an embodiment of this disclosure. Part(s) of system architecture 200 can be used to implement a loopback in system architecture 100 of FIGS. 1A and 1B.

System architecture 200 comprises transceiver (TRx) chip 202; select 204 (which can select between multiple signal paths, such as sending a signal to gain 206 or to self-test/AntCal/VSWR 226); gain 206; coupler 208; isolator/circulator 210; cavity filter 212; antenna port 214; antenna 216; antenna coupler 218; antenna calibration port 220; switch 222; self-test/VSWR 224; self-test/AntCal/VSWR 226; feedback receiver (FBRx) path 228; AND 230; and low noise amplifier receiver (LNA Rx) path 232.

A loopback path in system architecture 200 can transceiver chip 202; select 204; self-test/AntCal/VSWR 226; self-test/VSWR 224; AND 230; and LNA Rx path 232. This loopback path can generally start at a transmitter of transceiver chip 202, and end at a receiver of transceiver chip 202. By connecting the transmitter and the receiver, a signal that is sent out on the transmitter can be looped back and received at the receiver.

Figure 3:
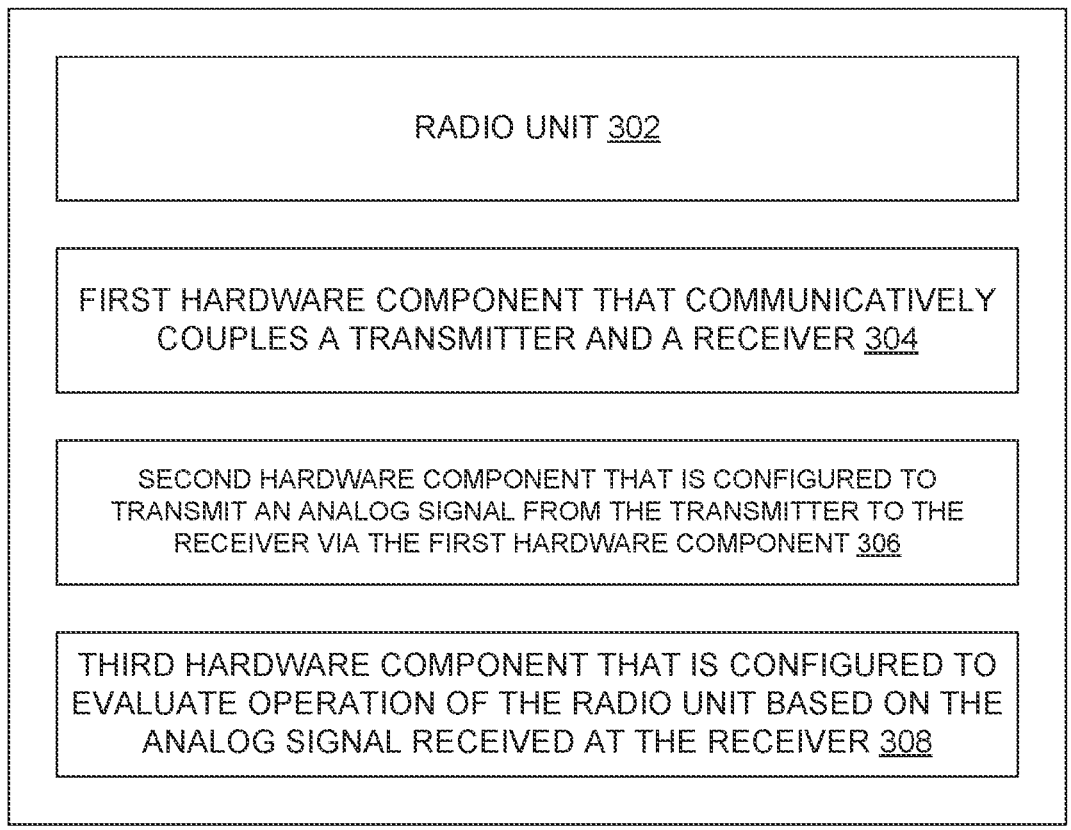
FIG. 3 illustrates another example system architecture that can facilitate calibration and test of radios spanning digital and analog domains, in accordance with an embodiment of this disclosure.

FIG. 3 illustrates another example system architecture 300 that can facilitate calibration and test of radios spanning digital and analog domains, in accordance with an embodiment of this disclosure. In some examples, part(s) of system architecture 300 can be used to implement part(s) of system architecture 100 of FIGS. 1A and 1B, and/or system architecture 200 of FIG. 2.

System architecture 300 comprises radio unit 302; first hardware component that communicatively couples a transmitter and a receiver 304; second hardware component that is configured to transmit an analog signal from the transmitter to the receiver via the first hardware component 306; and third hardware component that is configured to evaluate operation of the radio unit based on the analog signal received at the receiver 308.

In some examples, first hardware component that communicatively couples a transmitter and a receiver 304 comprises a selector that can select between a first signal path and a second signal path. This selector can be similar to select 204 of FIG. 2.

Radio unit 302 can be similar to radio unit 142 of FIGS. 1A and 1B. In some examples, radio unit 302 comprises a transmitter and a receiver, such as a transmitter and a receiver of transceiver 130 of FIGS. 1A and 1B. Second hardware component that is configured to transmit an analog signal from the transmitter to the receiver via the first hardware component 306 can comprise a component that communicatively couples a transmitter and a receiver of transceiver 130 of FIGS. 1A and 1B. Third hardware component that is configured to evaluate operation of the radio unit based on the analog signal received at the receiver 308 can be similar to analysis and control block 116 of FIGS. 1A and 1B.

In some examples, third hardware component 308 is configured to calibrate the radio unit based on the analog signal received at the receiver. That is, information in an analog loopback can be used to calibrate a radio unit of a radio system.

In some examples, third hardware component 308 is configured to self-test the radio unit based on the analog signal received at the receiver. That is, information in an analog loopback can be used to self-test a radio unit of a radio system.

Figure 4:
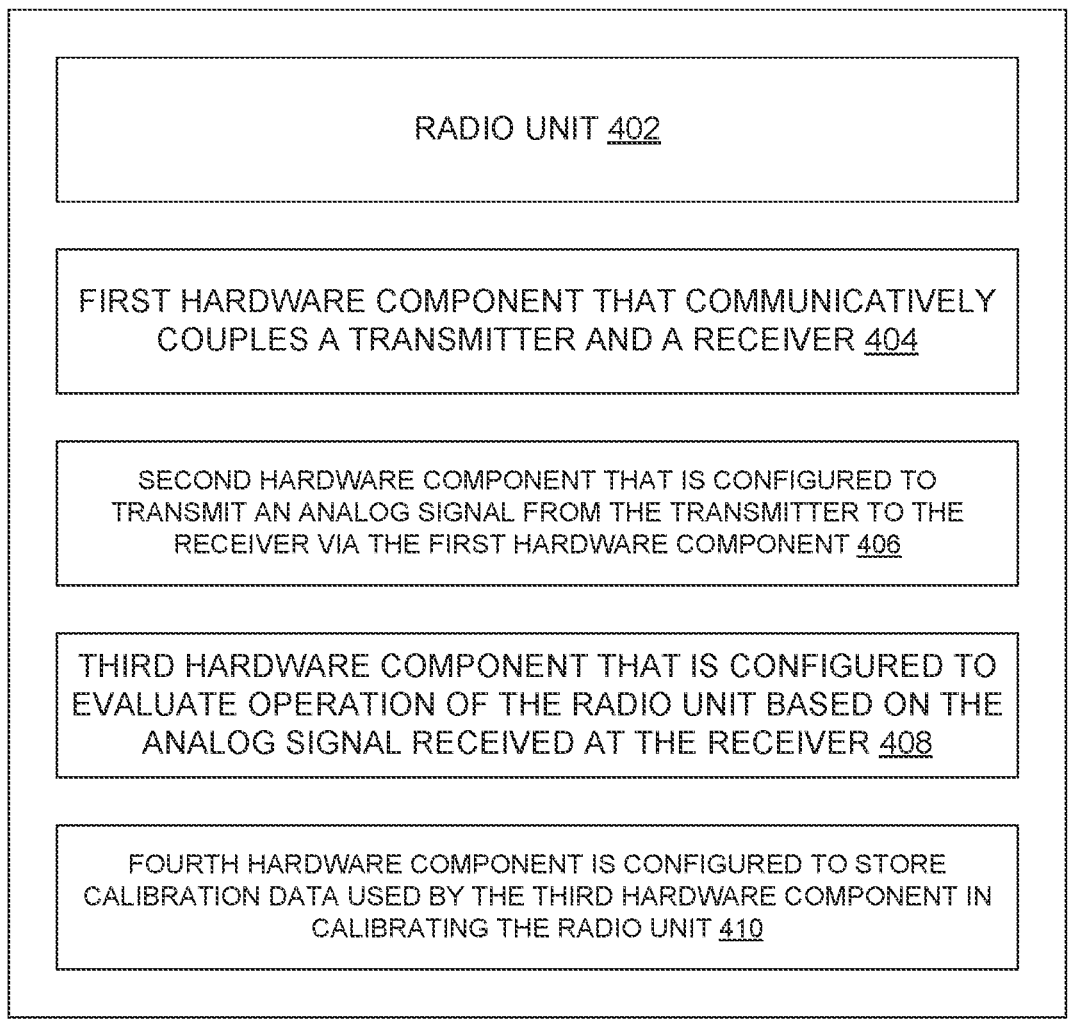
FIG. 4 illustrates another example system architecture that can facilitate calibration and test of radios spanning digital and analog domains, in accordance with an embodiment of this disclosure.

FIG. 4 illustrates another example system architecture 400 that can facilitate calibration and test of radios spanning digital and analog domains, in accordance with an embodiment of this disclosure. In some examples, part(s) of system architecture 400 can be used to implement part(s) of system architecture 100 of FIGS. 1A and 1B, and/or system architecture 200 of FIG. 2.

System architecture 400 comprises radio unit 402 (which can be similar to radio unit 302 of FIG. 3); first hardware component that communicatively couples a transmitter and a receiver 404 (which can be similar to first hardware component that communicatively couples a transmitter and a receiver 304); second hardware component that is configured to transmit an analog signal from the transmitter to the receiver via the first hardware component 406 (which can be similar to second hardware component that is configured to transmit an analog signal from the transmitter to the receiver via the first hardware component 306); third hardware component that is configured to evaluate operation of the radio unit based on the analog signal received at the receiver 408 (which can be similar to third hardware component that is configured to evaluate operation of the radio unit based on the analog signal received at the receiver 308); and fourth hardware component is configured to store calibration data used by the third hardware component in calibrating the radio unit 410.

That is, where third hardware component 408 uses information in an analog loopback to calibrate a radio unit of a radio system, third hardware component 408 can perform this calibration using calibration data stored by fourth hardware component 410.

Figure 5:
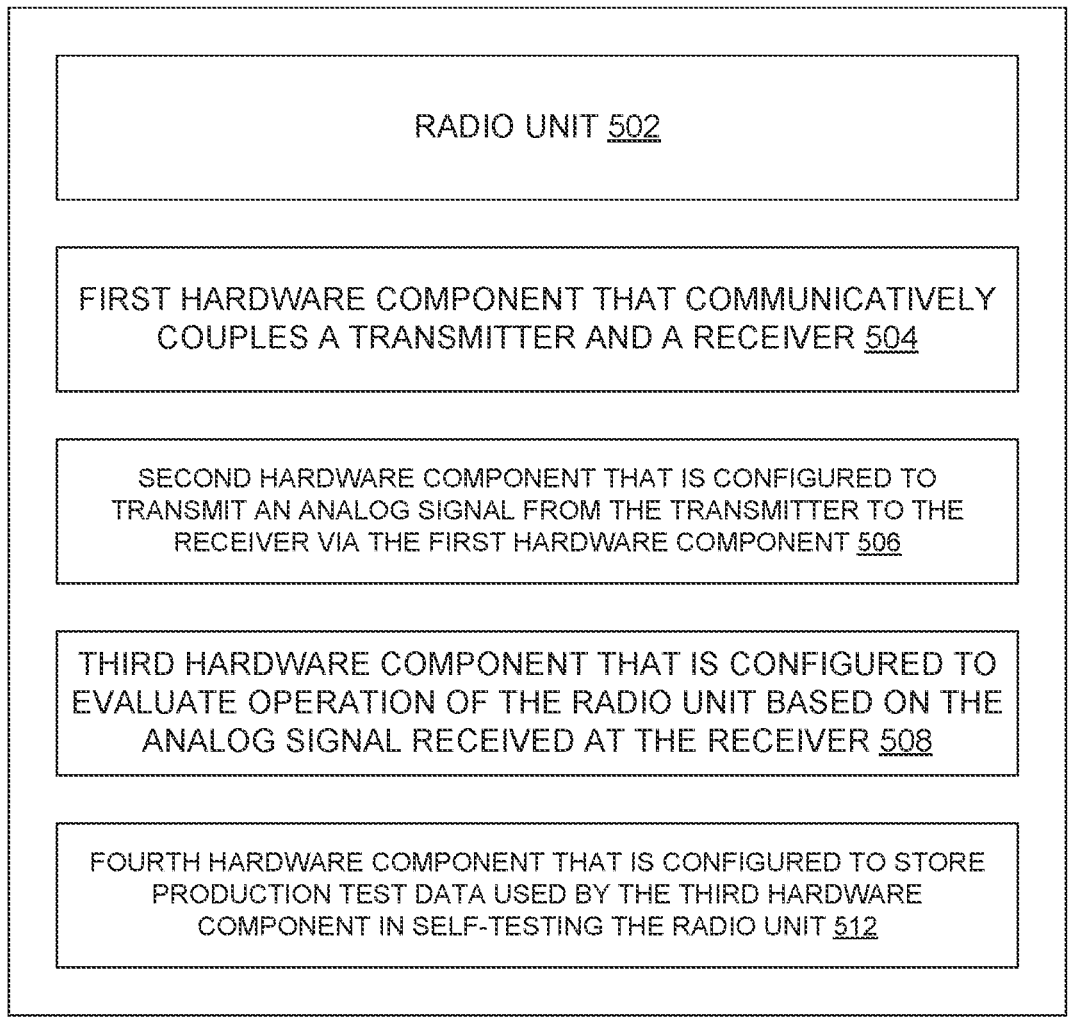
FIG. 5 illustrates another example system architecture that can facilitate calibration and test of radios spanning digital and analog domains, in accordance with an embodiment of this disclosure.

FIG. 5 illustrates another example system architecture 500 that can facilitate calibration and test of radios spanning digital and analog domains, in accordance with an embodiment of this disclosure. In some examples, part(s) of system architecture 500 can be used to implement part(s) of system architecture 100 of FIGS. 1A and 1B, and/or system architecture 200 of FIG. 2.

System architecture 500 comprises radio unit 502 (which can be similar to radio unit 302 of FIG. 3); first hardware component that communicatively couples a transmitter and a receiver 504 (which can be similar to first hardware component that communicatively couples a transmitter and a receiver 304); second hardware component that is configured to transmit an analog signal from the transmitter to the receiver via the first hardware component 506 (which can be similar to second hardware component that is configured to transmit an analog signal from the transmitter to the receiver via the first hardware component 306); third hardware component that is configured to evaluate operation of the radio unit based on the analog signal received at the receiver 508 (which can be similar to third hardware component that is configured to evaluate operation of the radio unit based on the analog signal received at the receiver 308); and fourth hardware component that is configured to store production test data used by the third hardware component in self-testing the radio unit 512.

That is, where third hardware component 508 uses information in an analog loopback to self-test a radio unit of a radio system, third hardware component 508 can perform this self-test using production test data stored by fourth hardware component 512.

In some examples, third hardware component 508 is configured to generate self-test data based on self-testing the radio unit, and wherein the third component is configured to transmit the self-test data to a distributed unit. In some examples, third hardware component 508 is configured to generate self-test data based on self-testing the radio unit, and wherein the third component is configured to transmit the self-test data to a central unit. In some examples, third hardware component 508 is configured to generate self-test data based on self-testing the radio unit, and wherein the third component is configured to transmit the self-test data to an entity that created the radio unit for storage and analysis. That is, field self-tested data can be conveyed to a distributed unit, to a central unit, and/or transmitted back to a manufacturer or an operator of the radio system for further storage and analysis.

FIG. 6 illustrates another example system architecture 600 that can facilitate calibration and test of radios spanning digital and analog domains, in accordance with an embodiment of this disclosure. In some examples, part(s) of system architecture 600 can be used to implement part(s) of system architecture 100 of FIGS. 1A and 1B, and/or system architecture 200 of FIG. 2.

System architecture 600 comprises first hardware component that is configured to transmit an analog signal from a transmitter of a radio unit to a receiver of the radio unit via an analog loopback between the transmitter and the receiver 602; and second hardware component is configured to evaluate operation of the radio unit based on the analog signal received at the receiver 604.

In some examples, first hardware component that is configured to transmit an analog signal from a transmitter of a radio unit to a receiver of the radio unit via an analog loopback between the transmitter and the receiver 602 comprises a selector that can select between the analog loopback and a first signal path. This selector can be similar to select 204 of FIG. 2.

In some examples, first hardware component that is configured to transmit an analog signal from a transmitter of a radio unit to a receiver of the radio unit via an analog loopback between the transmitter and the receiver 602 can comprise a component that communicatively couples a transmitter and a receiver of transceiver 130 of FIGS. 1A and 1B. In some examples, second hardware component is configured to evaluate operation of the radio unit based on the analog signal received at the receiver 604 can be similar to analysis and control block 116 of FIGS. 1A and 1B

In some examples, second hardware component 604 is configured to calibrate the radio unit asynchronously with self-testing the radio unit. That is, it can be that calibration is not required to be performed coincidently with the test execution and therefore calibration may be performed out of sync with a test.

In some examples second hardware component 604 is configured to update test data via calibrating the radio unit to produce updated test data, and to use the updated test data in the self-testing of the radio unit. That is, it can be that calibration performed asynchronously with test execution can be updated and/or applied to test data in a fashion to derive absolute performance of the tested radio parameters. In some examples, relative data can be used for testing within an individual radio, and some data used to differentiate faults and failures can be gathered from non-calibrated data.

In some examples, evaluating operation of the radio unit comprises calibrating and self-testing the radio unit, and wherein the calibrating and the self-testing of the radio unit is controlled by the radio unit, by a distributed unit, or by a combination of the radio unit and the distributed unit. That is, calibration and test can be controlled and stimulation can originate from the radio unit only, the distributed unit only, or a hybrid combination of radio unit and distributed unit interactions.

FIG. 7 illustrates another example system architecture 700 that can facilitate calibration and test of radios spanning digital and analog domains, in accordance with an embodiment of this disclosure. In some examples, part(s) of system architecture 300 can be used to implement part(s) of system architecture 100 of FIGS. 1A and 1B, and/or system architecture 200 of FIG. 2.

System architecture 700 comprises first hardware component that is configured to transmit an analog signal from a transmitter of a radio unit to a receiver of the radio unit via an analog loopback between the transmitter and the receiver 702 (which can be similar to first hardware component that is configured to transmit an analog signal from a transmitter of a radio unit to a receiver of the radio unit via an analog loopback between the transmitter and the receiver 602 of FIG. 6); second hardware component is configured to evaluate operation of the radio unit based on the analog signal received at the receiver 704 (which can be similar to second hardware component is configured to evaluate operation of the radio unit based on the analog signal received at the receiver 604); and third hardware component that is configured to inject a custom signal into the radio unit, wherein the second hardware component is configured to calibrate a down link antenna of the radio unit and an up link antenna of the radio unit during live-air data 706.

That is, third hardware component 706 can be similar to custom signal data memory, generation, masking, and buffer 150 of FIGS. 1A and 1B. In some examples, an antenna loopback topology can facilitate calibration of down link and up link antennas during live-air data using custom signaling.

FIG. 8 illustrates another example system architecture 800 that can facilitate calibration and test of radios spanning digital and analog domains, in accordance with an embodiment of this disclosure. In some examples, part(s) of system architecture 800 can be used to implement part(s) of system architecture 100 of FIGS. 1A and 1B, and/or system architecture 200 of FIG. 2.

System architecture 800 comprises first hardware component that is configured to transmit an analog signal from a transmitter of a radio unit to a receiver of the radio unit via an analog loopback between the transmitter and the receiver 802 (which can be similar to first hardware component that is configured to transmit an analog signal from a transmitter of a radio unit to a receiver of the radio unit via an analog loopback between the transmitter and the receiver 602 of FIG. 6); second hardware component is configured to evaluate operation of the radio unit based on the analog signal received at the receiver 804 (which can be similar to second hardware component is configured to evaluate operation of the radio unit based on the analog signal received at the receiver 604); and third hardware component that is configured to inject a custom signal that is sourced from a down link of the radio unit during non-live-air data (sometimes referred to as non-mission mode data) using custom signaling, wherein the second hardware component is configured to calibrate and test an up link of the radio unit based on the custom signal 806.

That is, third hardware component 806 can be similar to custom signal data memory, generation, masking, and buffer 150 of FIGS. 1A and 1B. In some examples, an analog loopback topology can facilitate up link test and calibration using custom signals sourced from a down link during non-live-air data using custom signaling.

Example Process Flows

Figure 9:
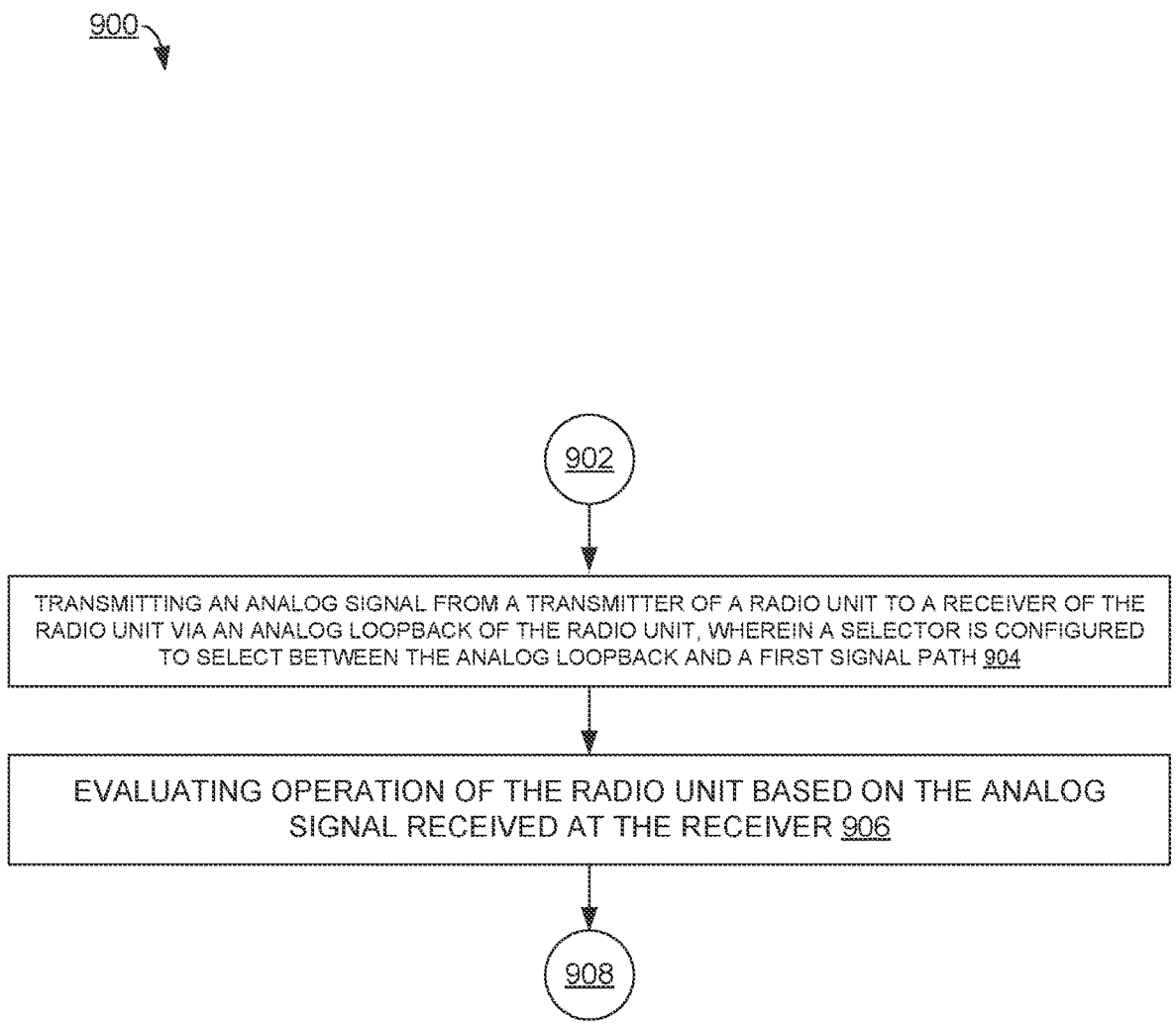
FIG. 9 illustrates an example process flow that can facilitate calibration and test of radios spanning digital and analog domains, in accordance with an embodiment of this disclosure.

FIG. 9 illustrates an example process flow that can facilitate calibration and test of radios spanning digital and analog domains, in accordance with an embodiment of this disclosure. In some examples, one or more embodiments of process flow 900 can be implemented by system architecture 100 of FIGS. 1A and 1B, and/or system architecture 200 of FIG. 2.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 1000 of FIG. 10, process flow 1100 of FIG. 11, process flow 1200 of FIG. 12, process flow 1300 of FIG. 13, and/or process flow 1400 of FIG. 14.

Process flow 900 begins with 902, and moves to operation 904.

Operation 904 depicts transmitting an analog signal from a transmitter of a radio unit to a receiver of the radio unit via an analog loopback of the radio unit, wherein a selector is configured to select between the analog loopback and a first signal path. In some examples, operation 904 can be performed by second hardware component that is configured to transmit an analog signal from the transmitter to the receiver via the first hardware component 306 of FIG. 3. In some examples, selector can be similar to select 204 of FIG. 2.

After operation 904, process flow 900 moves to operation 906.

Operation 906 depicts evaluating operation of the radio unit based on the analog signal received at the receiver. In some examples, operation 906 can be performed by third hardware component that is configured to evaluate operation of the radio unit based on the analog signal received at the receiver 308.

After operation 906, process flow 900 moves to 908, where process flow 900 ends.

Figure 10:
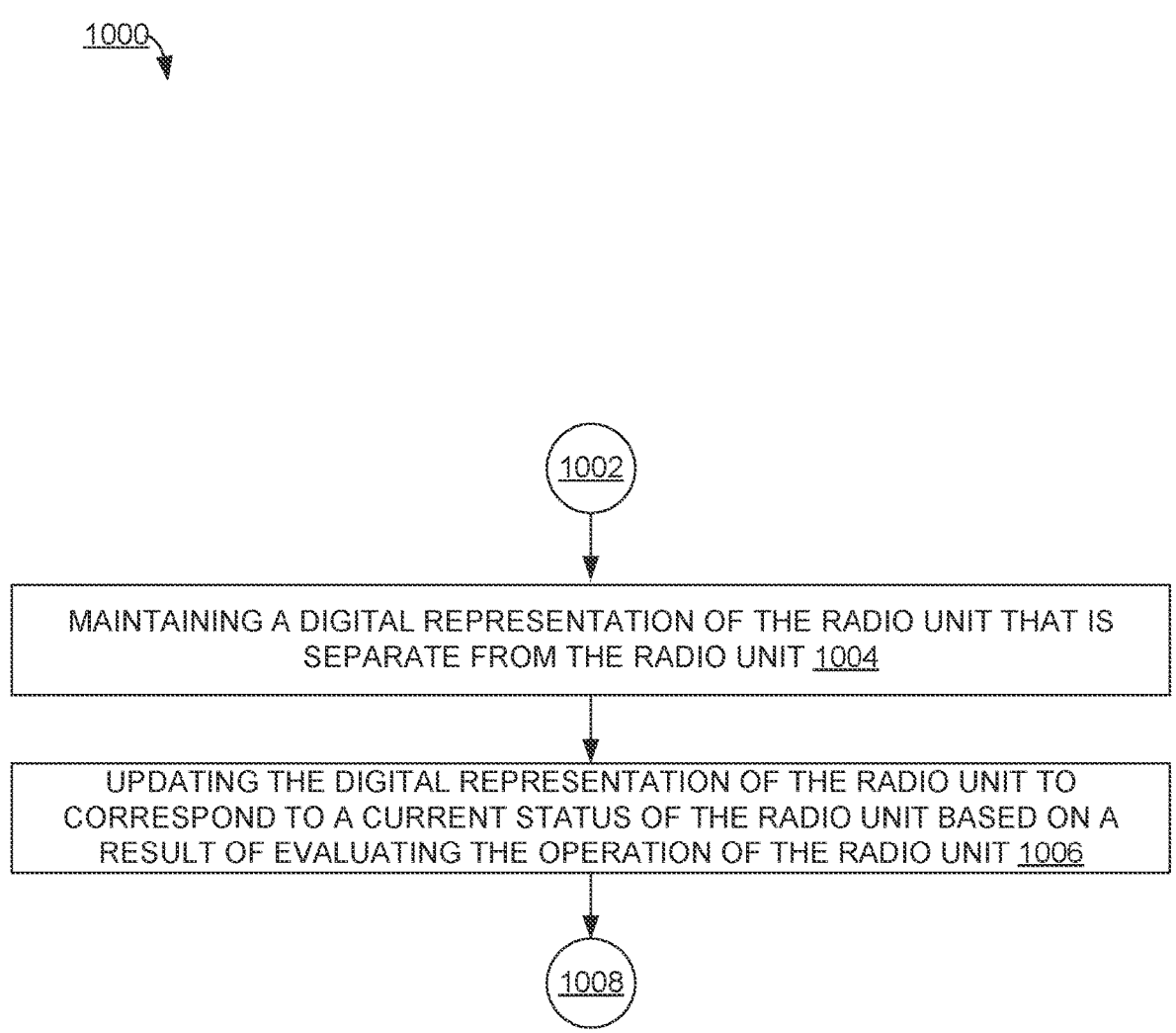
FIG. 10 illustrates an example process flow that can facilitate calibration and test of radios spanning digital and analog domains, in accordance with an embodiment of this disclosure.

FIG. 10 illustrates an example process flow that can facilitate calibration and test of radios spanning digital and analog domains, in accordance with an embodiment of this disclosure. In some examples, one or more embodiments of process flow 1000 can be implemented by system architecture 100 of FIGS. 1A and 1B, and/or system architecture 200 of FIG. 2.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 900 of FIG. 9, process flow 1100 of FIG. 11, process flow 1200 of FIG. 12, process flow 1300 of FIG. 13, and/or process flow 1400 of FIG. 14.

Process flow 1000 begins with 1002, and moves to operation 1004.

Operation 1004 depicts maintaining a digital representation of the radio unit that is separate from the radio unit. That is, in some examples, a radio in the field can have a "digital twin," which can comprise a digital representation of the ongoing lifetime performance of a radio that is transmitted to, and maintained by, a manufacturer or an operator of the radio.

After operation 1004, process flow 1000 moves to operation 1006.

Operation 1006 depicts updating the digital representation of the radio unit to correspond to a current status of the radio unit based on a result of evaluating the operation of the radio unit.

After operation 1006, process flow 1000 moves to 1008, where process flow 1000 ends.

Figure 11:
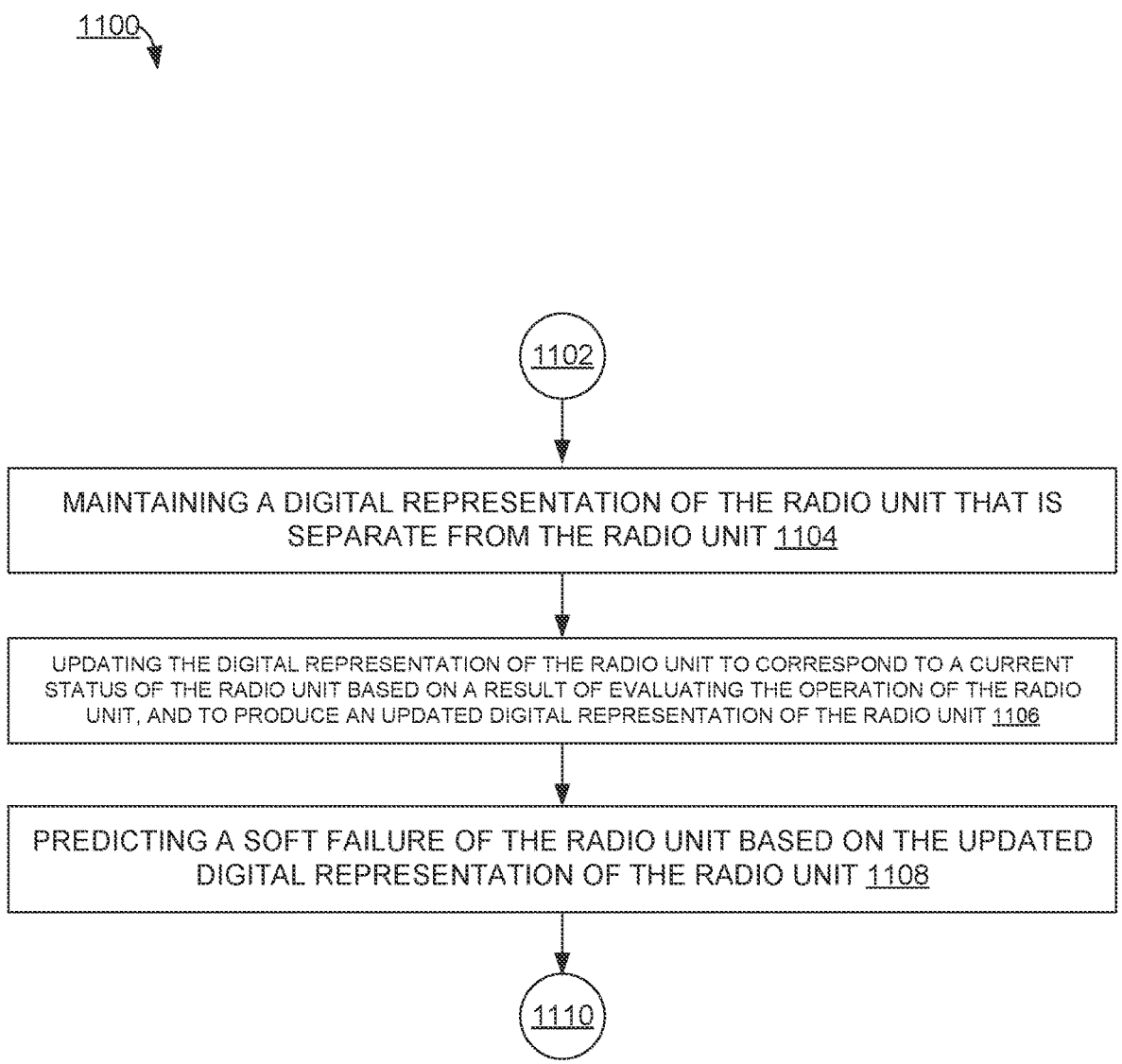
FIG. 11 illustrates an example process flow that can facilitate calibration and test of radios spanning digital and analog domains, in accordance with an embodiment of this disclosure.

FIG. 11 illustrates an example process flow that can facilitate calibration and test of radios spanning digital and analog domains, in accordance with an embodiment of this disclosure. In some examples, one or more embodiments of process flow 1100 can be implemented by system architecture 100 of FIGS. 1A and 1B, and/or system architecture 200 of FIG. 2.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of process flow 900 of FIG. 9, process flow 1000 of FIG. 10, process flow 1200 of FIG. 12, process flow 1300 of FIG. 13, and/or process flow 1400 of FIG. 14.

Process flow 1100 begins with 1102, and moves to operation 1104.

Operation 1104 depicts maintaining a digital representation of the radio unit that is separate from the radio unit. In some examples, operation 1104 can be implemented in a similar manner as operation 1004 of FIG. 10.

After operation 1104, process flow 1100 moves to operation 1106.

Operation 1106 depicts updating the digital representation of the radio unit to correspond to a current status of the radio unit based on a result of evaluating the operation of the radio unit, and to produce an updated digital representation of the radio unit. In some examples, operation 1106 can be implemented in a similar manner as operation 1006 of FIG. 10.

After operation 1106, process flow 1100 moves to operation 1108.

Operation 1108 depicts predicting a failure of the radio unit based on the updated digital representation of the radio unit.

After operation 1108, process flow 1100 moves to 1110, where process flow 1100 ends.

Figure 12:
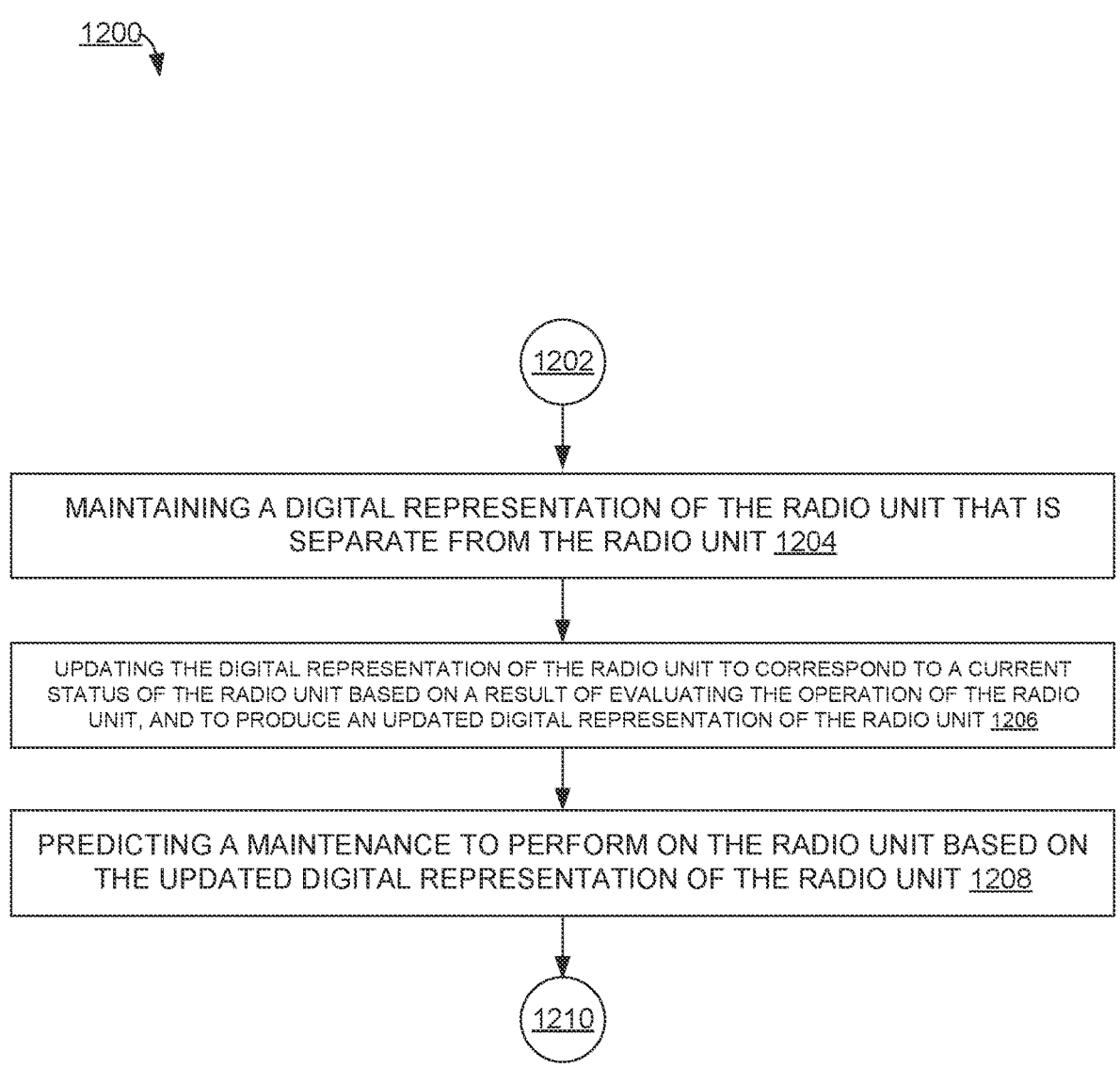
FIG. 12 illustrates an example process flow that can facilitate calibration and test of radios spanning digital and analog domains, in accordance with an embodiment of this disclosure.

FIG. 12 illustrates an example process flow that can facilitate calibration and test of radios spanning digital and analog domains, in accordance with an embodiment of this disclosure. In some examples, one or more embodiments of process flow 1200 can be implemented by system architecture 100 of FIGS. 1A and 1B, and/or system architecture 200 of FIG. 2.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of process flow 900 of FIG. 9, process flow 1000 of FIG. 10, process flow 1100 of FIG. 11, process flow 1300 of FIG. 13, and/or process flow 1400 of FIG. 14.

Process flow 1200 begins with 1202, and moves to operation 1204.

Operation 1204 depicts maintaining a digital representation of the radio unit that is separate from the radio unit. In some examples, operation 1204 can be implemented in a similar manner as operation 1004 of FIG. 10.

After operation 1204, process flow 1200 moves to operation 1206.

Operation 1206 depicts updating the digital representation of the radio unit to correspond to a current status of the radio unit based on a result of evaluating the operation of the radio unit, and to produce an updated digital representation of the radio unit. In some examples, operation 1206 can be implemented in a similar manner as operation 1006 of FIG. 10.

After operation 1206, process flow 1200 moves to operation 1208.

Operation 1208 depicts predicting a maintenance to perform on the radio unit based on the updated digital representation of the radio unit.

After operation 1208, process flow 1200 moves to 1210, where process flow 1200 ends.

Figure 13:
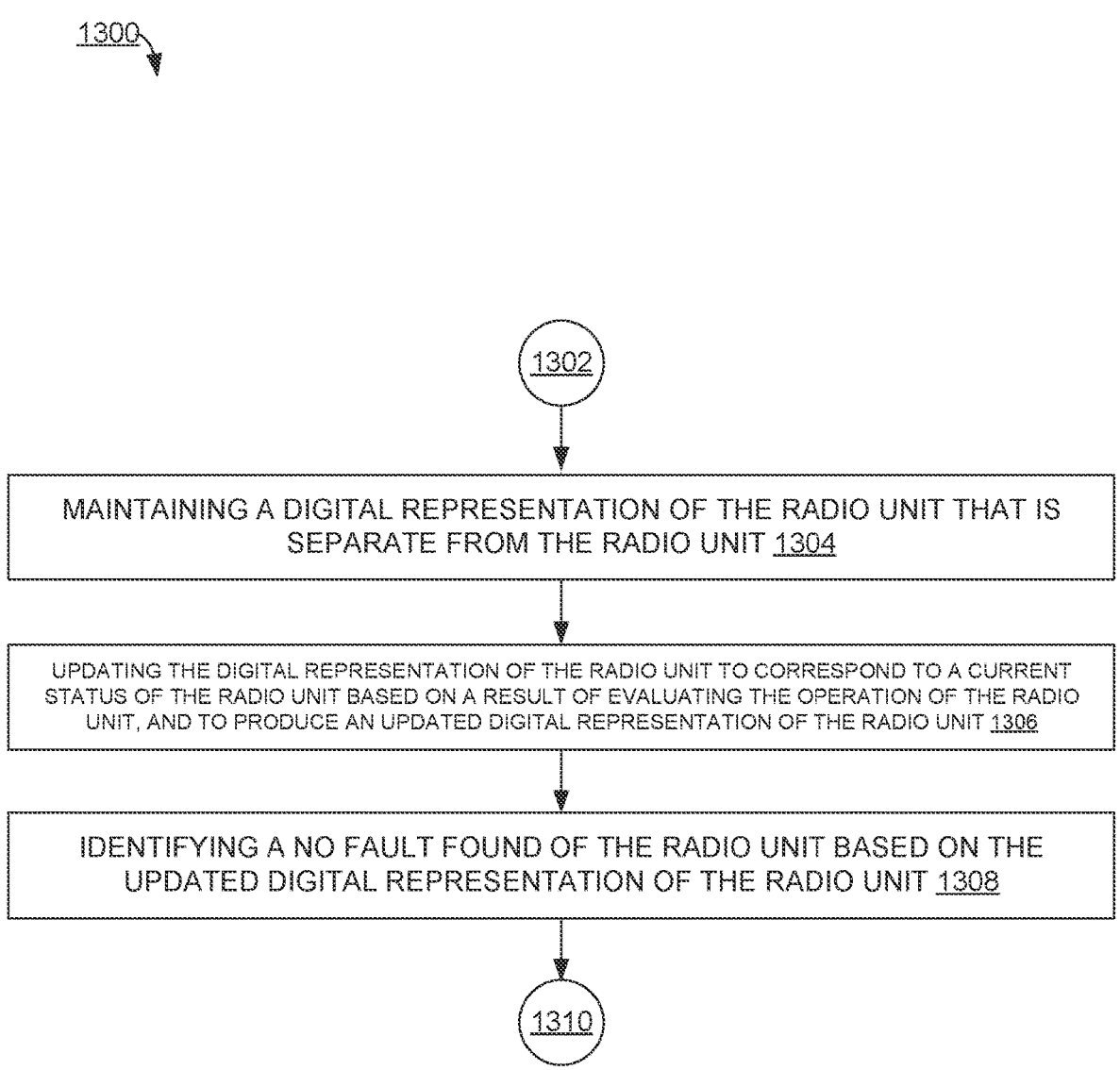
FIG. 13 illustrates an example process flow that can facilitate calibration and test of radios spanning digital and analog domains, in accordance with an embodiment of this disclosure.

FIG. 13 illustrates an example process flow that can facilitate calibration and test of radios spanning digital and analog domains, in accordance with an embodiment of this disclosure. In some examples, one or more embodiments of process flow 1300 can be implemented by system architecture 100 of FIGS. 1A and 1B, and/or system architecture 200 of FIG. 2.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of process flow 900 of FIG. 9, process flow 1000 of FIG. 10, process flow 1100 of FIG. 11, process flow 1200 of FIG. 12, and/or process flow 1400 of FIG. 14.

Process flow 1300 begins with 1302, and moves to operation 1304. Operation 1304 depicts maintaining a digital representation of the radio unit that is separate from the radio unit. In some examples, operation 1304 can be implemented in a similar manner as operation 1004 of FIG. 10.

After operation 1304, process flow 1300 moves to operation 1306.

Operation 1306 depicts updating the digital representation of the radio unit to correspond to a current status of the radio unit based on a result of evaluating the operation of the radio unit, and to produce an updated digital representation of the radio unit. In some examples, operation 1306 can be implemented in a similar manner as operation 1006 of FIG. 10.

After operation 1306, process flow 1300 moves to operation 1308.

Operation 1308 depicts identifying a no fault found of the radio unit based on the updated digital representation of the radio unit.

After operation 1308, process flow 1300 moves to 1310, where process flow 1300 ends.

Figure 14:
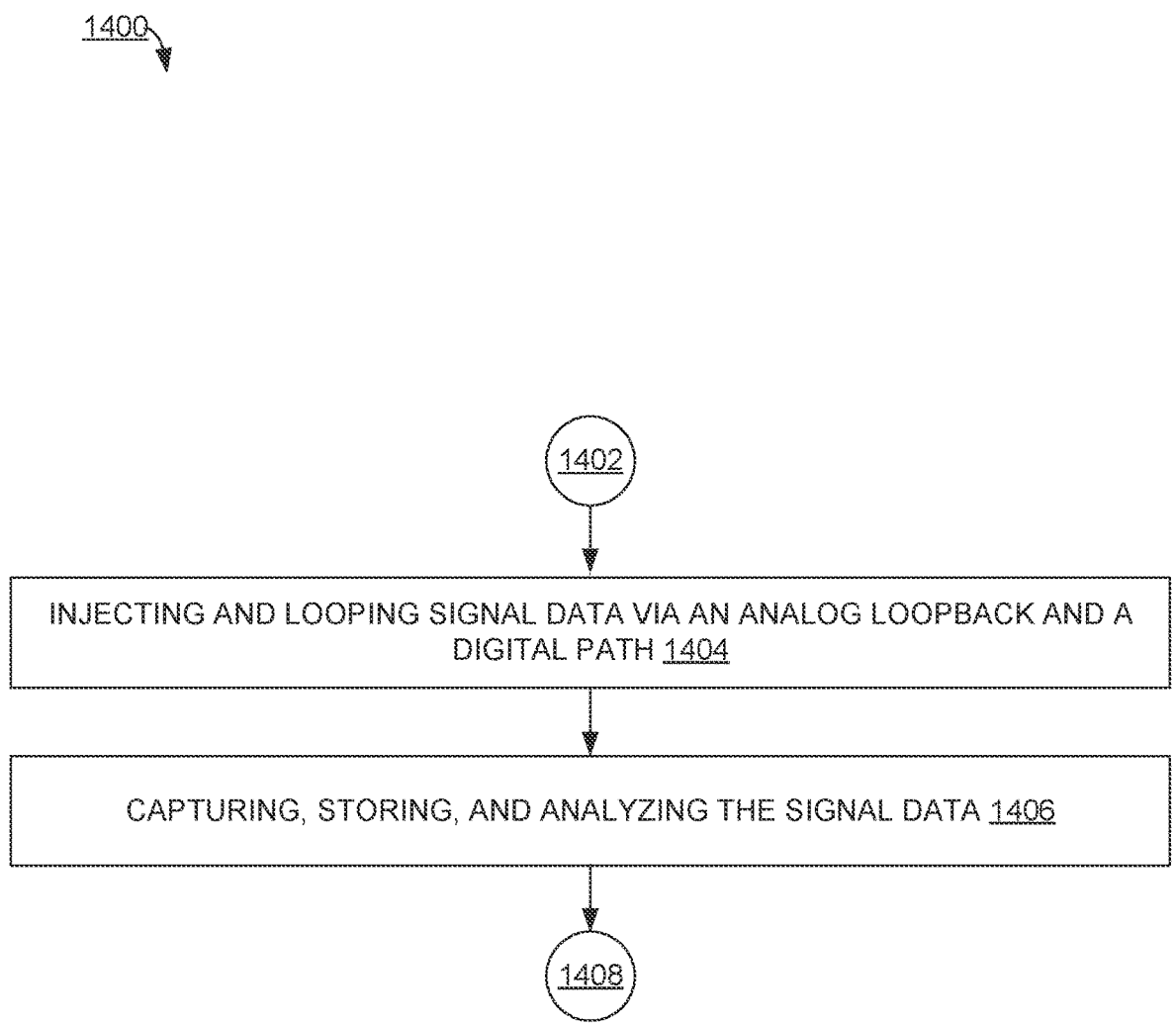
FIG. 14 illustrates an example process flow that can facilitate calibration and test of radios spanning digital and analog domains, in accordance with an embodiment of this disclosure.

FIG. 14 illustrates an example process flow that can facilitate calibration and test of radios spanning digital and analog domains, in accordance with an embodiment of this disclosure. In some examples, one or more embodiments of process flow 1400 can be implemented by system architecture 100 of FIGS. 1A and 1B, and/or system architecture 200 of FIG. 2.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of process flow 900 of FIG. 9, process flow 1000 of FIG. 10, process flow 1100 of FIG. 11, process flow 1200 of FIG. 12, and/or process flow 1300 of FIG. 13.

Process flow 1400 begins with 1402, and moves to operation 1404.

Operation 1404 depicts injecting and looping signal data via an analog loopback and a digital path. Using the example of FIGS. 1A and 1B, an analog loopback can be implemented between a transmitter and a receiver of transceiver 130. This analog loopback can be used to perform various radio system functions, such as calibration or self-test. For instance, a loopback can be implemented between transmission (Tx) blocks 132, and receiver (Rx) blocks 136. In other examples, a loopback can be implemented between transmission (Tx) blocks 132, antenna calibration (AntCal) and built-in self-test (BIST) calibration port 140, and feedback receiver (FBRx) blocks 134.

After operation 1404, process flow 1400 moves to operation 1406.

Operation 1406 depicts capturing, storing, and analyzing the signal data. That is, injection and looping signal data via digital and analog paths internal to the radio, then capturing, storing and analyzing the resulting data can be performed to self-test the radio system.

After operation 1406, process flow 1400 moves to 1408, where process flow 1400 ends.

Example Architecture

Figure 15:
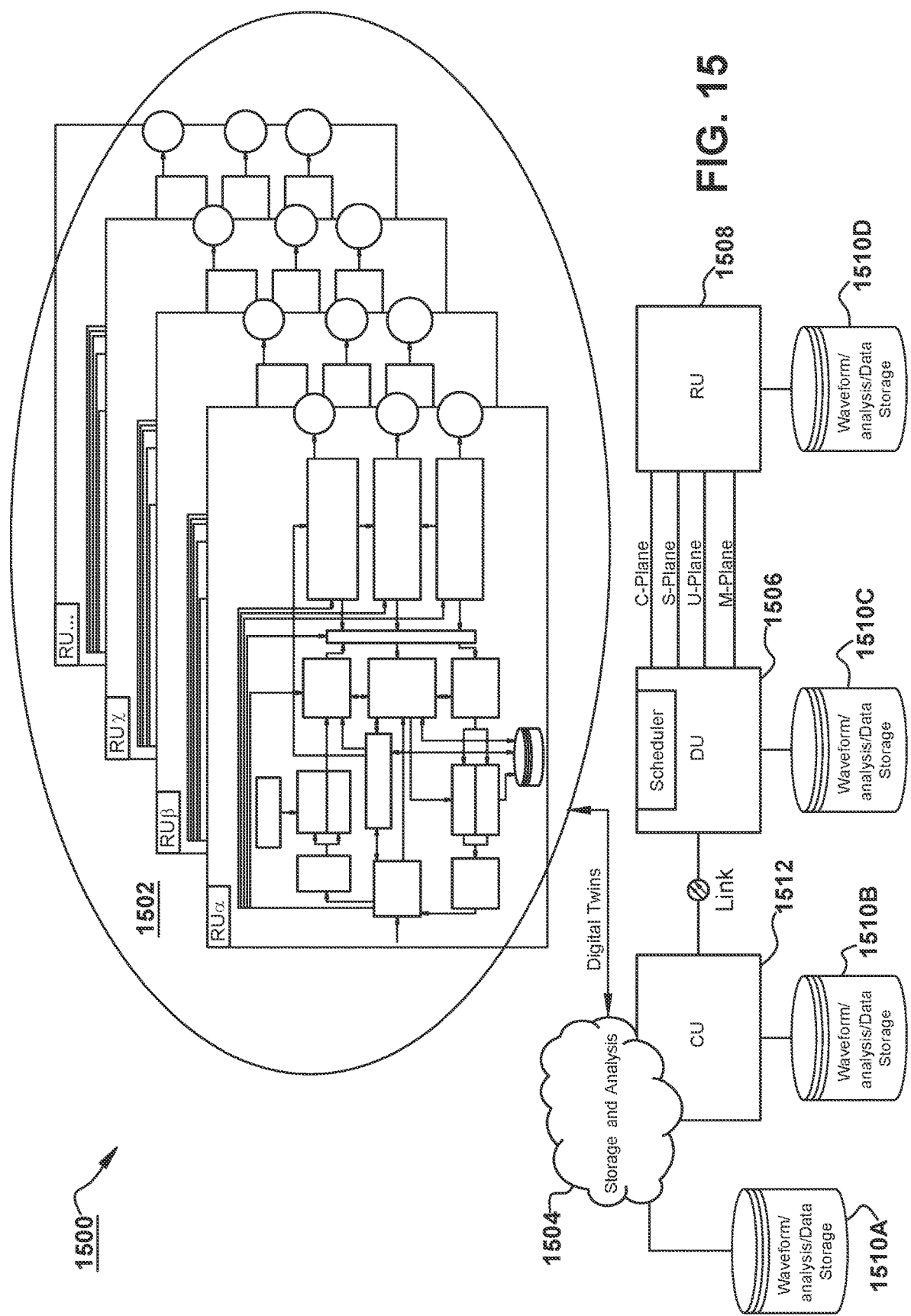
FIG. 15 illustrates an example system architecture for a digital twin and/or predictive modeling, and that can calibration and test of radios spanning digital and analog domains, in accordance with an embodiment of this disclosure.

FIG. 15 illustrates an example system architecture 1500 for using capture and storage of a signal from tap points for a digital twin and/or predictive modeling, and that can facilitate capture and storage from signal tap points, in accordance with an embodiment of this disclosure.

In some examples, system architecture 1500 can produce a digital twin of a corresponding radio system and/or perform predictive modeling of the radio system, where this corresponding radio system can be similar to system architecture 100 of FIGS. 1A and 1B and/or system architecture 200 of FIG. 2.

System architecture 1500 comprises models 1502, storage and analysis 1504, distributed unit 1506, radio unit 1508, waveform/analysis/data storage 1510A, waveform/analysis/data storage 1510B, waveform/analysis/data storage 1510C, waveform/analysis/data storage 1510D, and central unit (CU) 1512.

Tap points disposed in radio unit 1508 and/or distributed unit 1506 can be used to capture signals. This information can be transmitted to central unit 1510 for storage and analysis 1504. Storage and analysis 1504 can produce models 1502. Models 1502 can be digital twins of radio systems, including a radio system comprising distributed unit 1506 and radio unit 1508. Models 1502 can also be other forms of modeling of a radio system to be used in predictive modeling of how the radio system will behave in the future (e.g., how it will perform, or whether it will need repair).

A digital twin can generally comprise a computer model of a radio system (rather than an actual physical radio system), and can be used to estimate how the corresponding physical radio system will behave.

Captured signals can also be stored and/or analyzed in various locations at waveform/analysis/data storage 1510A, waveform/analysis/data storage 1510B, waveform/analysis/data storage 1510C, and/or waveform/analysis/data storage 1510D.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a radio unit that comprises a transmitter and a receiver;
    first hardware that is configured to transmit an analog signal from the transmitter to the receiver via an analog loopback between the transmitter and the receiver; and
    second hardware that is configured to evaluate operation of the radio unit based on the analog signal received at the receiver,
        wherein the second hardware is configured to calibrate the radio unit asynchronously with self-testing the radio unit, and
        wherein the second hardware is further configured to update test data via calibration of the radio unit to produce updated test data, and to use the updated test data in the self-testing of the radio unit.

2. The system of claim 1, wherein the first hardware comprises a selector configured to select between the analog loopback and a signal path other than the analog loopback.

3. The system of claim 1, further comprising:
    third hardware that is configured to evaluate operation of the radio unit based on the analog signal received at the receiver, wherein the third hardware is different from the first hardware and the second hardware.

4. The system of claim 3, wherein the third hardware is configured to calibrate the radio unit based on the analog signal received at the receiver.

5. The system of claim 4, further comprising:
    fourth hardware that is configured to store calibration data used by the third hardware in calibrating the radio unit, wherein the fourth hardware is different from the first hardware, the second hardware, and the third hardware.

6. The system of claim 3, wherein the third hardware is further configured to self-test the radio unit based on the analog signal received at the receiver.

7. The system of claim 3, further comprising:
    fourth hardware that is configured to store production test data used by the third hardware in the self-testing of the radio unit.

8. The system of claim 7, wherein the third hardware is further configured to generate self-test data based on the self-testing of the radio unit, and wherein the third hardware is further configured to transmit the self-test data to a distributed unit.

9. The system of claim 7, wherein the third hardware is further configured to generate self-test data based on the self-testing of the radio unit, and wherein the third hardware is further configured to transmit the self-test data to a central unit.

10. The system of claim 7, wherein the third hardware is further configured to generate self-test data based on the self-testing of the radio unit, and wherein the third hardware is further configured to transmit the self-test data to an entity that created the radio unit for storage and analysis.

11. A method, comprising:
    transmitting, by a system, an analog signal from a transmitter of a radio unit to a receiver of the radio unit via an analog loopback of the radio unit; and
    evaluating, by the system, operation of the radio unit based on the analog signal received at the receiver, wherein the evaluating comprises calibrating the radio unit asynchronously with self-testing the radio unit, and wherein the evaluating comprises updating test data via the calibrating of the radio unit to produce updated test data, and to use the updated test data in the self-testing of the radio unit.

12. The method of claim 11, further comprising:
maintaining, by the system, a digital representation of the radio unit that is separate from the radio unit; and
updating, by the system, the digital representation of the radio unit to correspond to a current status of the radio unit based on a result of evaluating the operation of the radio unit.

13. The method of claim 12, wherein updating the digital representation of the radio unit produces an updated digital representation of the radio unit, and further comprising:
predicting, by the system, a soft failure of the radio unit based on the updated digital representation of the radio unit.

14. The method of claim 12, wherein updating the digital representation of the radio unit produces an updated digital representation of the radio unit, and further comprising:
predicting, by the system, a maintenance to perform on the radio unit based on the updated digital representation of the radio unit.

15. The method of claim 12, wherein updating the digital representation of the radio unit produces an updated digital representation of the radio unit, and further comprising:
identifying, by the system, a no fault found of the radio unit based on the updated digital representation of the radio unit.

16. An apparatus, comprising:
a first hardware component that is configured to transmit an analog signal from a transmitter of a radio unit to a receiver of the radio unit via an analog loopback; and
a second hardware component that is configured to evaluate operation of the radio unit based on the analog signal received at the receiver, wherein the second hardware component is further configured to update test data via calibrating the radio unit to produce updated test data, and to use the updated test data in self-testing of the radio unit.

17. The apparatus of claim 16, wherein the second hardware component is further configured to calibrate the radio unit asynchronously with the self-testing of the radio unit.

18. The apparatus of claim 16, further comprising:
a third hardware component that is configured to inject a custom signal into the radio unit, wherein the second hardware component is further configured to calibrate a downlink antenna of the radio unit and an uplink antenna of the radio unit during live-air data transmission.

19. The apparatus of claim 16, further comprising:
a third hardware component that is configured to inject a custom signal that is sourced from a downlink of the radio unit during non-live-air data transmission using custom signaling, wherein the second hardware component is further configured to calibrate and test an uplink of the radio unit based on the custom signal.

20. The apparatus of claim 16, wherein evaluating the operation of the radio unit comprises the calibrating and the self-testing of the radio unit, and wherein the calibrating and the self-testing of the radio unit are controlled by at least one of the radio unit or a distributed unit.

* * * * *